ALBERT A. REINMAN
INVENTOR.

BY Fraser and Bogucki
ATTORNEYS

July 21, 1964  A. A. REINMAN  3,141,806
APPARATUS FOR FORMING A WOUND HOLLOW STRUCTURE
OF FIBER REINFORCED TAPE
Filed April 14, 1960  3 Sheets-Sheet 2

ALBERT A. REINMAN
INVENTOR.

BY Fraser and Bogucki

ATTORNEYS

July 21, 1964  A. A. REINMAN  3,141,806
APPARATUS FOR FORMING A WOUND HOLLOW STRUCTURE
OF FIBER REINFORCED TAPE
Filed April 14, 1960  3 Sheets-Sheet 3

ALBERT A. REINMAN
INVENTOR.

BY Fraser and Bogucki
ATTORNEYS

United States Patent Office

3,141,806
Patented July 21, 1964

3,141,806
APPARATUS FOR FORMING A WOUND HOLLOW STRUCTURE OF FIBER REINFORCED TAPE
Albert A. Reinman, Redondo Beach, Calif., assignor to H. I. Thompson Fiber Glass Company, Los Angeles, Calif.
Filed Apr. 14, 1960, Ser. No. 22,188
15 Claims. (Cl. 156—425)

This invention relates to machines for fabricating structures which have excellent temperature and erosion resistant properties, and more particularly to machines for fabricating fiber reinforced structures in which the fibers are disposed most advantageously for exposure to high temperature sources.

With the increasing usage of devices which employ or encounter very high temperature conditions, there is a growing need for materials and structures which are resistive to the decomposition and erosion which ordinarily result from exposure to high temperature gases and other environments. There have thus been developed a number of compositions and materials which maintain their physical integrity under exposure to high temperature gases or sources, but which at the same time have low heat conductivity and high resistance to erosion and ablation effects. A particularly advantageous class of such structures is provided by the use of fiber reinforced materials, and a particularly suitable type of materials within this class is that which uses vitreous fibers having a high silica content.

Vitreous silica has a high melting point and a high heat of vaporization, as well as excellent viscosity and thermal characteristics at and about its melting point. These properties are usually best utilized in configurations in which the silica fibers are used as reinforcements in an impregnated structure, such as one impregnated with a phenolic resin. Reinforced bodies using fibers which have a high vitreous silica content are now employed to provide the exposed surface portions of many jet engine and rocket parts. Alternatively, however, other fibers and impregnating materials may be used in accordance with modern plastics fabrication techniques. The reinforcing materials may initially be in the form of mats, rovings or batts, although textiles are usually used.

A particularly significant development in the provision of high temperature structures is concerned with the disposition of the individual fibers relative to the exposed surface. The structures are usually built up of laminations, as of successive layers of plastic impregnated cloth. It has been shown that when these laminations are at an angle which is inclined in the same direction as the movement of the adjacent gases, so that the part of a layer which is most exposed is that which is furthest along the path of flow, the structure is more resistant to heat erosion effects than it is when the laminations are inclined toward the gas flow, thus allowing the successive layers to be exposed to peeling forces.

A related and also significant part of the control of fiber disposition pertains to the direction in which the individual fibers are oriented relative to the exposed surface. It has been shown that if only the fiber ends are presented at the exposed surface there is a further appreciable increase in the resistance to erosion and ablation. With such a construction each fiber is anchored firmly in a cold region of the laminated structure, so that only the exposed ends melt away. Accordingly, the interlocking relationship of the great majority of the fibers is retained, so that the total strength of the structure and its physical integrity are preserved. This "end grain orientation" of the fibers makes most excellent use of the viscosity and heat af vaporization characteristics of the silica fibers, and effectively carries the heat away so that the cold side of the structure remains at a much lower temperature.

A number of problems have been encountered in fabricating high temperature structures in which both the direction of lamination and the individual orientation of the fiber reinforcements are properly controlled. A principal difficulty arises from the fact that silica fiber materials of sufficiently high silica content are relatively expensive. Many techniques which have heretofore been used have not been able to avoid large proportions of waste material thus have been prohibitive in cost. Similarly, the use of special weaving techniques has also been found to be too costly for most applications.

A number of difficulties have also been encountered because of the necessity of having high and uniform density throughout the entire fabricated structure. Clearly, the greater the content of silica fibers per unit volume, relative to the impregnating material, the greater will be the temperature and erosion resistance of the structure. The problems involved in producing uniform parts are often materially increased because the resin impregnated silica fiber textiles which are usually employed are apt to vary appreciably in certain respects. It has been found that difficulties can arise relative to controlling the thickness and tackiness (surface adhesive properties) of these textiles. In the fabrication of temperature resistant structures, therefore, these and other variable factors have resulted in wide variations in density within the structure. The results of the variations have included loss of high temperature properties, decrease in the physical properties, and occasionally cracking and failure of the structure during subsequent processing steps.

It has been shown, in a previously filed application for patent, Serial No. 1,554, filed Janaury 11, 1960, by Hector R. Barrios et al., that the above difficulties may be minimized by a technique in which strips of silica fiber material may be wound upon a rotating central form and partially densified by axial compression during the winding process. As described in the Barrios et al. application, structures having the desired individual fiber dispositions may be provided rapidly, uniformly, and with a minimum of waste material by this technique. This technique, however, sometimes limits the size or configuration of the structure which can be provided. Thus, it has been found difficult to fabricate thick-walled structures which are uniform in density throughout the wall. Stringent requirements are imposed where the direction of the laminations may have to be at a critical or severe angle, and when there is a requirement for uniform density along the entire length of the structure.

It is therefore an object of the present invention to provide improved machines for fabricating high temperature and erosion resistant structures of fiber reinforced materials in which the fibers have selected dispositions.

Another object of the present invention is to provide an improved machine for rapidly and reliably fabricating high temperature resistant structures which are uniform in density throughout their thickness and along their entire length.

A further object of the present invention is to provide an improved machine for fabricating structures in the form of surfaces of revolution having relatively thick walls which are defined by laminations lying in selected directions, the laminations consisting of fiber reinforcing materials in which the individual fibers lie in selected orientations relative to the surfaces of the structure.

Machines in accordance with the invention may utilize a central rotatable mandrel about which a distortable tape of fiber material is wound in the form of ring laminations. The tape material being added onto the wound structure may be maintained under pressure by roller means, extending across the width of the tape, which are segmented relative to the width of the tape. The roller means may be controlled in movement so as to bear against the tape material in a direction normal to the desired direction of lamination, and may be coupled to provide a controlled and uniform pressure along the entire length of the mandrel.

In particular arrangements in accordance with the invention a rotatable turntable which turns about a vertical axis may be mounted in a frame structure which also includes drive means for the turntable. A mandrel coupled to the turntable may extend along a vertical axis and be supported in the frame, with the mandrel having an outer configuration which matches the inner configuration desired for the product. A distortable tape material, such as a textile woven of high silica content fibers which are disposed on a bias relative to the direction of elongation of the tape, is wound edgewise about the mandrel as the mandrel rotates. Thus the tape material is wound helically upon the mandrel to form ring laminations in the desired direction of lamination. A pressure mechanism mounted in the frame brings one or more pressure roller devices to bear against the turn of strip which is added onto the wound structure. The working surfaces of the pressure roller devices are preferably of a material having a low coefficient of friction, and are segmented across the width of the tape. Each of the segments is free to rotate relative to the other segments, and rolls along the tape material so as to press the wound structure together and to achieve partial densification. A substantially constant pressure is exerted by the pressure roller devices upon the wound structure along the entire length of the mandrel, by an air cylinder coupled to the pressure rollers and a constant pressure control for the air cylinder. The pressure mechanism, and the pressure roller devices, may be placed in desired attitudes relative to the direction of lamination of the wound structure, so that the pressure rollers bear against the tape material in a direction normal to the desired direction of lamination.

In accordance with another feature of this invention, the directions of lamination are maintained substantially uniform along the length of the wound structure through the use of filamentary guide elements and a special folding of the tape material. The tape material is folded over the filamentary guide element along its length, with the guide element being employed to control placement and tensioning of the tape material. Additional edge folds introduced into the tape compensate for the width of the filamentary guide element and maintain the direction of the laminations uniform.

In accordance with another aspect of the present invention, special frictional surfaces may be employed on the outside of the mandrel when the structure to be fabricated is tapered in a direction such that the tape material would tend to ride along the mandrel away from the body of the wound structure.

A better understanding of the invention may be had by reference to the following description, taken in conjunction with the accompanying drawings, in which.

Figure 1:
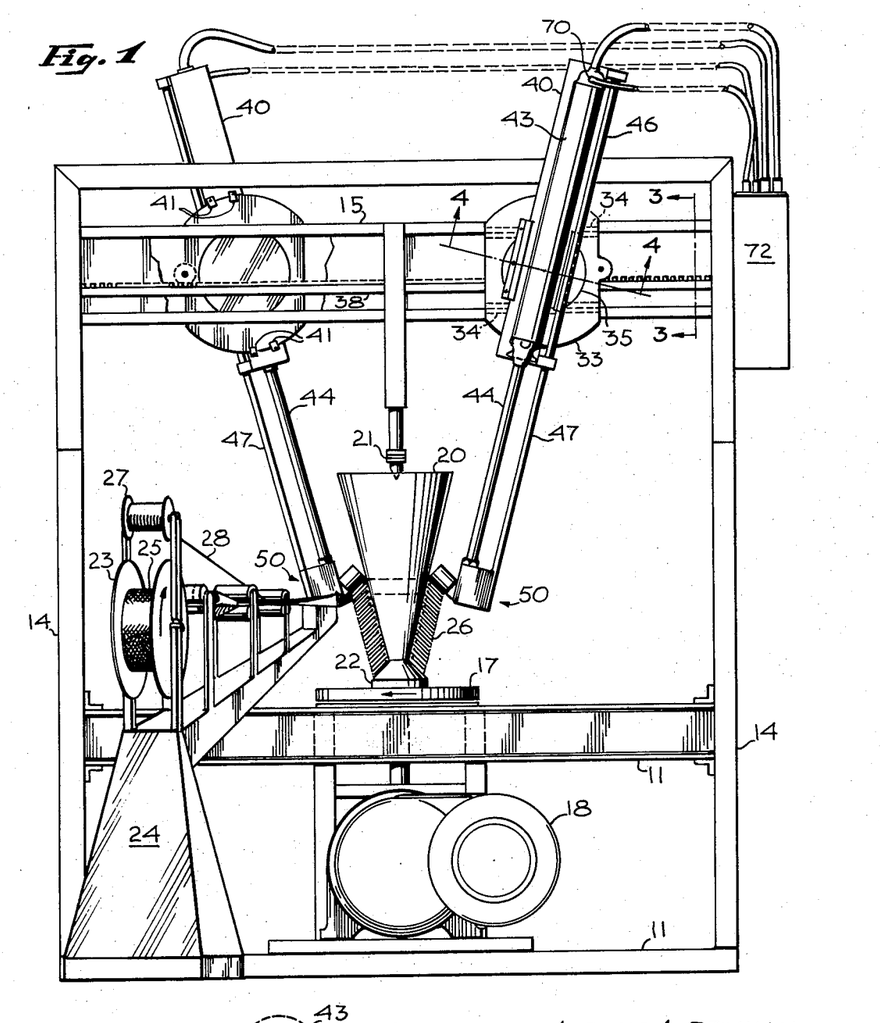
FIG. 1 is a front view of one machine in accordance with the invention which utilizes pressure roller devices, an air pressure source, and a distortable tape material.
Figures 2, 10:
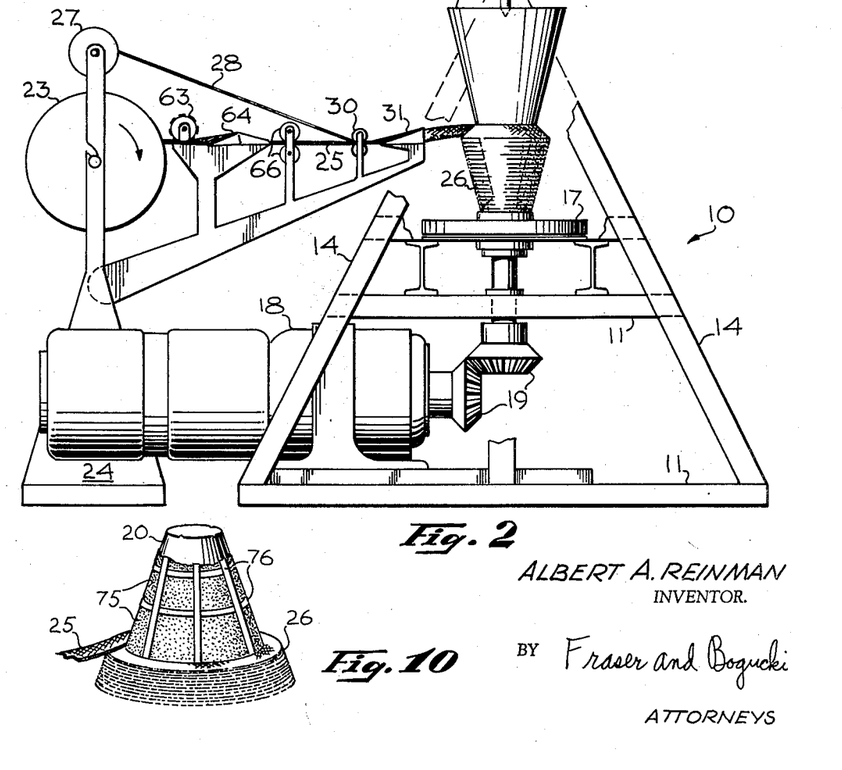
FIG. 2 is a side view of the machine of FIG. 1, with portions of the structure being broken away.
FIG. 10 is a fragmentary perspective view of an arrangement which may be used in conjunction with the machines shown.
Figure 3:
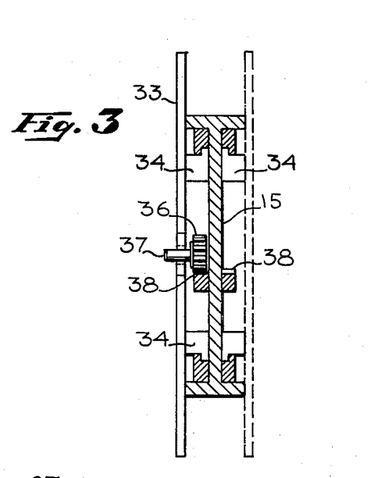
FIG. 3 is a sectional view of a portion of the arrangement of FIG. 1, taken along the line 3—3 of FIG. 1 and looking in the direction of the appended arrows.
Figure 4:
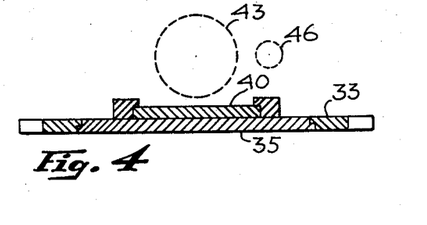
FIG. 4 is a detailed view of a fragment of the arrangement of FIG. 1, taken along the line 4—4 of FIG. 1 and looking in the direction of the appended arrows.

Referring now to FIGS. 1, 2 and 3, there is shown a machine for winding high temperature resistant structures which have relatively thick walls and uniform density both across and along the length of the walls. Although the machine will be described in terms of a vertical winding axis, and as having front and rear portions, it will be understood that these terms are used for ease of reference only, and that the machine may have arbitrary positions and attitudes. The machine includes a rigid frame structure 10 having a stable mounting base 11. Side supports 14 extending upwardly from the base 11 are coupled by a top bar portion of the frame 10 and a generally I-shaped cross member 15 (best seen in section in FIG. 3). A number of operative elements are supported by, and movable along, the cross member 15.

A turntable 17 is rotatably mounted in the base 11, and driven by a motor 18 through a mechanical coupling 19 which may consist of beveled gears, as shown, or a belt or some other form of drive. The turntable 17 rotates about a vertical axis which defines a central operating axis for the machine. A mandrel 20 is mounted upon the turntable 17 and coupled to rotate therewith. Because the various couplings and mounts may be of conventional types, they have not been illustrated in detail.

At its upper end, the mandrel 20 is rotatably supported in a centering member 21 which extends from the cross member 15. The mandrel 20 includes, at its lower end relative to the frame, a lay-up ring 22 which provides a surface having an angle of inclination corresponding to that desired for the direction of lamination of the structure which is to be wound. The remainder of the outer configuration of the mandrel 20 corresponds to the configuration, and to the approximate dimensions, desired for the inner surface of the structure to be formed.

A feed reel 23 which is rotatably mounted on a fixed reel base 24 provides a supply of distortable tape material 25 for the machine. The feed reel 23 is shown at a fixed location but may be arranged, for some applications, to be movable with other parts of the machine so as to feed the tape 25 toward the mandrel 20 at a relatively constant angle, regardless of the amount of tape wound about the mandrel. A wound structure 26 is built up by the tape 25 and the mandrel 20.

As shown generally in FIGS. 1 and 2, a guide filament reel 27 which is also coupled to and mounted rotatably in the reel base 24 provides a supply of guide filament 28 to be fed coextensively with the tape 25. The guide filament 28 may be a wire or other thin and relatively strong material, but in the present example is preferably a nylon cord. The guide filament 28 is fed centrally along the length of the tape 25 through guide rollers 30, and the tape 25 is then folded along its center line about the filament 28 by a fold guide 31. It is preferred to use guide rollers 30 and a fold guide 31 of a material having a low coefficient of friction, such as polytetrafluoroethylene, which will be more simply referred to be its recognized name of Teflon. The tape 25 is preferably additionally folded along its edges in a manner described more fully in conjunction with FIGS. 8 and 9, but such features have not been shown in detail for simplicity in the views of FIGS. 1 and 2.

Figure 6:
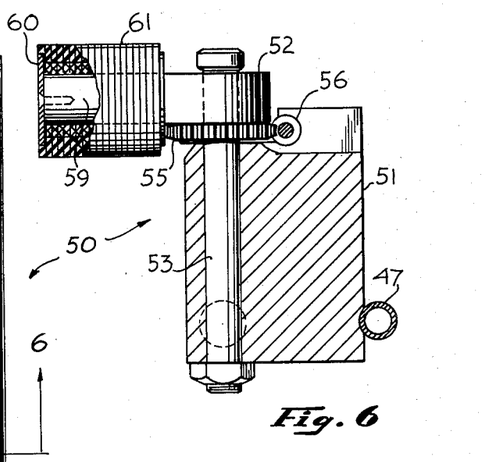
FIG. 6 is a plan sectional view of the pressure roller device, taken along the line 6—6 of FIG. 5 and looking in the direction of the appended arrows.

A pressure mechanism is employed which has two like units disposed on opposite sides of the mandrel 20. The two units of the pressure mechanism are each mounted in and supported by the cross member 15, with the units being reversed relative to each other in the front to rear direction. Each unit includes a hinge plate member 33 (FIGS. 3 and 6, as well as 1 and 2) including tongues 34 in slidable engagement in grooves extending along the cross member 15. A retainer plate 35 (best seen in FIGS. 1 and 6) is mounted to rotate within the hinge plate member 33 in a vertical plane. A gear 36 mounted on a shaft 37 in the hinge plate 33 meshes with a rack 38 extending along the cross member 15, and may be turned by a demountable crank (not shown) so as to position the hinge plate member 33 and the associated structure at a desired lateral location on the machine.

Each unit of the pressure mechanism also includes, referring again principally to FIG. 1, an air pressure system mounted on a support arm 40 affixed to the retainer plate 35. Clamps 41 adjustably mounted in the support arm 40 about the periphery of the hinge plate member 33 may be tightened to bear against the hinge plate member 33 and hold the retainer plate 35 and the support arm 40 in any desired position of rotation. An air cylinder 43 mounted on the support arm 40 includes a piston 44 having a free end which extends adjacent to the mandrel 20 at an angle determined by the setting of the retainer plate 35. Telescoping tubings 46, 47 which are anchored on the support arm 40 are extensible in a direction parallel to the piston 44 to provide additional support for elements mounted on the free end of the piston 44.

Figure 5:
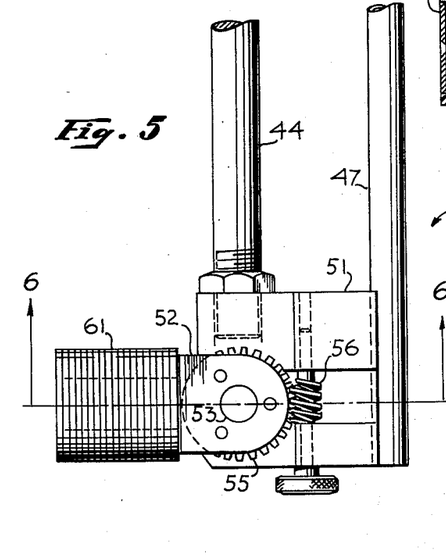
FIG. 5 is a side view of a pressure roller device.

For each of the units of the pressure mechanism, a pressure roller device 50 is mounted on the free ends of the piston 44 and the parallel tubing support 47 so as to be radially movable with the piston 44 relative to the retainer plate 35. The pressure roller device 50 may be seen in best detail in the views of FIGS. 5 and 6. With reference to those figures, each pressure roller device 50 includes a body member 51 coupled to the piston 44 and the tubing support 47 and an arm member 52 which is coupled to the body member 51 by a bolt 53. A worm gear 55 attached to the arm member 52 and a worm 56 rotatably mounted in the body member 51 permit the arm member 52 to be rotated to and maintained in any desired attitude relative to the body member 51.

The arm member 52 includes an integral bearing 59 which terminates in a roller cap 60, and a number of Teflon discs 61 are mounted about the bearing 59. Teflon is the United States registered trademark of E. I. du Pont de Nemours and Co., Inc., Wilmington, Delaware, for polytetrafluoroethylene fluorocarbon resins. Together, the Teflon discs 61 define a pressure cylinder which is rotatable relative to the bearing 59. Each of the discs 61 is, moreover, freely rotatable relative to the adjacent discs. With the pressure roller device 50 in operative position on the machine, the bearing 59 is directed radially inwardly toward the center of the mandrel 20 (FIG. 1) and the vertical axis about which the mandrel 20 rotates, and the pressure cylinder defined by the discs 61 may conveniently be referred to as being radially segmented.

Figure 7:
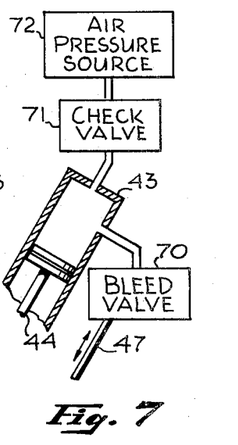
FIG. 7 is a simplified representation of an air pressure control which may be employed in the arrangement of FIG. 1.

The machine (referring again to FIG. 1) is so arranged that the pressures exerted by the pressure roller devices 50 are substantially constant along the entire length of the mandrel 20. To this end, the air cylinder 43 includes a bleed valve 70 (FIG. 7), coupled to the tubing support 47, and the bleed valve 70 operates to maintain the pressure in the air cylinder 43 constant despite the amount of retraction of the piston 44. Air pressure from a source 72 is provided through a check valve 71 to the enclosed portion of the air cylinder 43. Retraction of the piston 43 would otherwise tend to compress the air further, but the bleed valve 70 is opened a proportional amount to prevent the buildup. This results in the exertion of substantially constant pressure by the pressure roller device 50 on the wound structure 26.

The distortable tape 25 which is employed may be considered in more detail. In a preferred form for the present discussion, the tape 25 is a textile material made up of fibers having a high silica content, approximately 96% to 99% or more silica on a dehydrated basis. Preferably also, although not necessarily, the material is coated with a phenolic resin which is partially cured. These partially cured, or so-called B stage, resins provide some tackiness and increase the strength of the textile material during processing. In addition, the partially cured resin provides other advantages (including strength and drapeability) for handling and processing the product. It should be noted, however, that other fibers such as nylon, or other forms of vitreous fibers than those mentioned, may be employed and that the impregnating material need not be a resin or in a partially cured condition. The tape is referred to as being distortable because it may be stretched along its length or laterally across its length. This property in the present instance is derived from both the characteristics of resin impregnated silica fiber textiles and the fact that the tape is cut on bias relative to the weave of the textile. A bias of approximately 45° is ordinarily employed. Such a bias cut provides a tape material in which the individual fibers are disposed at an angle to the edge of the tape, as shown in the initial stages of the detailed views of FIGS. 8 and 9. When the tape is wound edgewise relative to the mandrel, therefore, the individual fibers have end grain orientations relative to the mandrel surface.

It is preferred to fabricate an essentially continuous (extremely long length) strip by cutting bolts of silica fiber textile material on a bias into strips, and then joining the bias cut strips together in overlapping end relation by heating the overlapping portions while under pressure and maintaining the pressure until the overlapping portions have cooled. It is then found that at the point of pressure the partially cured resins have joined in a firm seal to unite the adjacent sections of strip, to form the essentially continuous strips illustrated in FIGS. 8 and 9.

Figure 8:
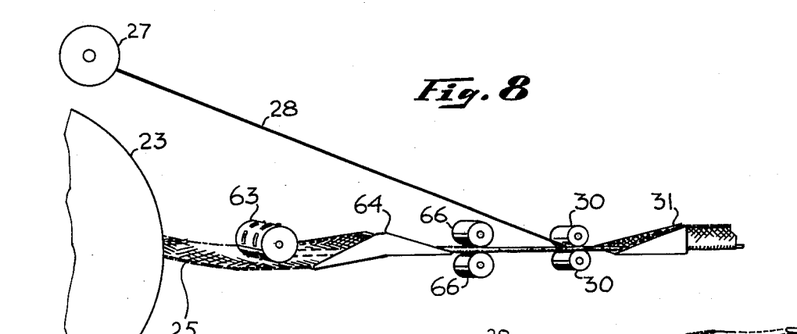
FIG. 8 is a simplified representation of a mechanism for feeding a distortable tape material to the machine of FIG. 1.
Figure 9:
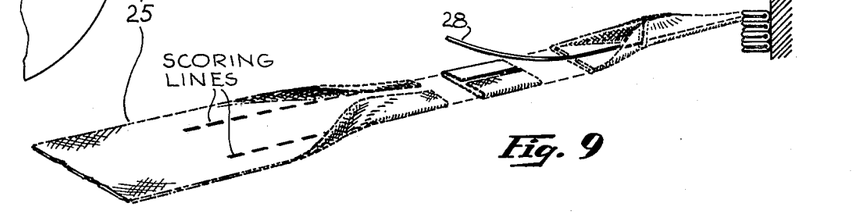
FIG. 9 is a perspective view of the configuration of distortable tape material which may be employed with the machine of FIG. 1.

Strip material of this nature may be of approximately .040" in non-compressed form and .020" in thickness in compressed form while a nylon guide filament 28 of suitable strength for use in the machine of FIGS. 1 and 2 may be approximately .040" in diameter. When the distortable tape 25 is folded over the guide filament 28, therefore, the presence of the filament causes the folded tape to bulge along the fold line, so that the directions of laminations may change during the winding process. Accordingly, as shown in the views of FIGS. 8 and 9, the edges of the tape material 25 are "folded in" prior to the folding of the tape material about its center over the nylon filament 28. This is accomplished by initially scoring the tape material by scoring rollers 63 at selected fold points along the length of the material, and then folding the edges of the material in along the scoring line by a shaped Teflon guide 64 and passing the tape material 25 through pressure rollers 66, which may be spring loaded, if desired, to form the configuration shown in the center portion of FIG. 9. Thereafter, as in FIG. 8, the double width edges of the tape material 25 may be folded over together about the nylon filament 28, by passage through the guide rollers 30 and the fold guide 31 (also shown in FIG. 1) prior to winding about the mandrel 20. The various rollers and guide elements are preferably of Teflon or some other low friction material.

In the operation of the arrangement illustrated in FIGS. 1 through 9, a mandrel 20 is employed which has an outer surface in the configuration of a surface of revolution which is the approximate shape and size desired for the inner surface of the structure to be fabricated. The mandrel 20 is mounted between the turntable 17 and the bearing 21, and is driven to rotate with the turntable 17 at a selected speed by the motor 18 through the coupling 19. The mandrel 20 includes, at its base portion, the lay-up ring 22 which defines the direction of lamination desired for the laminations in the final product. The two pressure mechanisms are adjusted by fixing the included retainer plate 35 and support arm 40 at desired position with the clamps 41, and moving the hinge plate member 33 with the gears 36 so that each piston 44 and support tubing 47 which holds a pressure roller device 50 extends at an angle which parallels the principal surface of the mandrel 20. The arm members 52 of the pressure roller devices 50 are then rotated by the worms 56 and worm gears 55 to positions in which the axes of rotation of the Teflon discs 61 are parallel to the direction of lamination desired. With respect to the central vertical axis of the mandrel 20, the Teflon discs 61 are then radially disposed across the width of the structure which is to be wound. The air pressure source 72 is maintained at any desired pressure. In one practical exemplification, given by way of example, an air pressure of approximately 60 p.s.i. was employed, the pressure exerted by the pressure roller devices 50 accordingly being of the order of approximately 400 p.s.i. based on the width of the tape and the desired density in the part. Because the desired final densities and configurations may vary widely, the pressure to be selected may also vary widely for a given part.

As the mandrel 20 is rotated, the distortable tape 25, prepared as previously described, is fed (see FIGS. 8 and 9 specifically) from the tape feed reel 23 while the nylon filament 28 is fed from the guide filament reel 27. The tape 25 is selected to be of a width such that in the subsequent processing the width of the folded over and wound structure is at least slightly greater than the desired wall thickness. The tape 25 from the feed reel 23 is first scored by the scoring rollers 63, the edges are folded in along the scoring lines by the Teflon guide 64, and the folded in edges are then pressed down between the pressure rollers 66. As the nylon filament 28 is fed coextensively along the length of the tape 25, the filament 28 is centrally placed relative to the width of the tape by the guide rollers 30, and the tape 25 is finally folded along its centerline about the nylon filament 28 as the elements pass through the fold guide 31.

The leading edge of the tape 25 is first affixed to, pressed against or merely wound in a turn about the mandrel 20 lay-up ring 22, so that subsequent turns may be wound upon the mandrel 20 under some tension to insure that the inner edge of the tape 25 is fitted tightly against the mandrel 20 and the adjacent turn of tape.

The distortable tape 25 is therefore wound edgewise about the mandrel 20, at an angle determined by the angle of the lay-up ring 22. In moving onto the wound structure 26 which is built up, the tape is pressed in toward the previously wound turns by the pressure roller devices 50. In the past, where it has been sought to use a wide material in order to build a thick wall in the final structure, a number of difficulties have been encountered. Materials of proper characteristics might be especially prepared for a particular application without giving a uniform density across the width of the tape. Further, only relatively low densities could be achieved with such arrangements. These difficulties are overcome by the employment of the bias cut tape material and the segmented pressure roller of low friction material disposed across the width of the tape.

As the tape material 25 is wound edgewise about the mandrel 20, the outer periphery of the tape turns faster than the inner periphery through the fact that the individual fibers, which are disposed at approximately 45° to the direction of elongation of the tape, distort sufficiently and do not restrict movement in either the longitudinal or lateral directions relative to the tape. The B stage resin impregnation does not restrict this distortability. In conjunction with the distortability of the tape, uniform compression across the width of the tape is achieved through the segmented discs 61 of low friction material. Because the discs 61 are free to turn relative to each other, they adjust to speeds which conform to the different peripheral speeds across the width of the tape, and prevent shearing forces from arising which would tend to cause the tape to tear, pull away from the mandrel, or have local faults.

The usefulness of the folded-in edges of the tape material 25 will now also be apparent. Where the nylon filament 28 is of appreciable thickness relative to the thickness of the tape, the inner edge of the wound structure cannot be sufficiently compressed, even if special means are employed, to prevent the inner surface from building up faster than the outer surface due to the presence of the filament 28. With tape material 25 of the usual dimensions of approximately .020″ and nylon filaments 28 of approximately .040″ for sufficient strength, it may be seen that, without compression, the inner edge would tend to build up at a rate twice that of the outer edge. The compression which is applied along the length of the long structure materially reduces this build-up differential, but a differential nonetheless exists which can become appreciable in some circumstances. By folding in the edges of the tape material 25 prior to doubling over for final winding, however, satisfactory compensation is made for the thickness of the nylon filament 28. Accordingly the direction of lamination is maintained with a high degree of precision along the entire length of the wound structure. This factor also insures uniformity in the thickness of the wall dimension as well.

The winding of the tape material 25 about the mandrel 20 proceeds along the length of the mandrel 20, with the pressure roller devices 50 moving along the mandrel 20 as the wound structure is built up. Because of the angle of inclination of the piston 44 and the support tubing 47, the Teflon discs 61 maintain a pressure normal to the direction of lamination at all times. Furthermore, by the use of the bleed mechanism 70 (best seen in FIG. 7) which is controlled by the mechanical motion of the piston 44 and support 47, the air pressure from the source 72 is maintained constant within the cylinder 43 despite retraction of the piston 44 into the air cylinder 43. The axial compression achieves a partial densification of the wound structure and materially aids the attainment of high final densities, so that the maintenance of uniform pressure in this manner is of particular significance.

When a wound structure 26 of the desired length has been built up on the mandrel 20, the final processing steps may be undertaken. Both the mandrel 20 and the wound structure 26 may be removed from the machine, and final densification may be achieved by fully curing the resin impregnation at an elevated temperature in an autoclave. Then the wound structure 26 may be removed from the mandrel 20 and machined to desired final dimensions. Alternatively, the wound structure 26 may first be densified by mechanical means, then cured, removed from the mandrel and machined.

The wound structures provided by machines in accordance with the present invention consist of ring-type laminations which lie in a desired direction, and also have end grain orientation of individual fibers which is desired. When used in high temperature applications, the temperature and erosion resistant properties of the materials employed are utilized to the fullest. Operation of the presently described machines is particularly useful in providing thick-walled structures, in maintaining constant density both along the length of the structure and through the walls of the structure, and in preserving these properties despite maintenance of the direction of laminations at a sharp angle relative to the surfaces which are exposed to the high temperature environments. It may readily be seen that a direction of lamination which is parallel or normal to the exposed surface may be much more easily provided than an intermediate angle.

While the present machines are described for use in conjunction with high silica content fibers formed in distortable tape materials, it will be recognized that other fibers, other coatings or impregnations and other forms of distortable tapes may also be employed. Thus, the distortable tape may be in the form of a roving, or consist of a mat material. It will also be recognized that a single pressure device may be employed if desired, or that more than two pressure devices may be used in other circumstances.

A further feature is provided, as is shown in FIG. 10, by the use of a frictional surface on a mandrel 20 where the taper of the mandrel 20 is such that the tape material 25 tends to ride away from the wound structure 26. With the mandrel 20 of FIG. 10, for example, a tape material 25 under tension might ride upwards, reducing the density of the structure and disturbing the uniformity. Accordingly, a layer of frictional material is placed about the mandrel 20 through use of a number of sheets of sandpaper 75 held together by pressure sensitive tape 76. The tape 76 may be placed only circumferentially about, or along the length of, the mandrel 20.

With this arrangement the distortable tape material 25 stays firmly in position against the adjacent turns. The presence of the frictional material does not alter the final dimensions of the structure, or may be compensated for in the size of the mandrel 20. Further, the sandpaper 75 and pressure sensitive tape 76 do not interfere with the subsequent processing steps in the formation of a fully machined product.

Thus there are provided improved machines for fabricating structures having superior temperature and erosion resistant properties. Uniformity and high density are provided in fiber reinforced structures constructed of materials which have controlled directions of lamination and individual fiber disposition.

What is claimed is:

1. Apparatus for building up a solid body which has a hollow center and consists of ring laminations of tape material, the directions of the laminations being at a selected angle other than parallel with the length of the body, the apparatus including in combination a rotatable central mandrel lying along and rotatable about a given axis, the mandrel having the configuration desired for the approximate inner form of the solid body and including a base portion which is substantially parallel to the direction desired for the laminations, whereby the tape material is positionable as a helical winding about the mandrel beginning with the base portion, at least one pressure roller movably mounted adjacent the periphery of the mandrel adjacent the path of the tape material as it is being laid down, the pressure roller extending across the width of the tape material and being divided into separate independently rotatable segments across the width of the tape material, the peripheral surfaces of the segmented portions of the pressure roller being of a material having a low coefficient of friction, and means including at least one support arm coupled to the pressure roller and supporting the pressure roller against the tape material as it is being laid down, said means being positioned to maintain a relatively uniform pressure by the pressure roller upon the tape material in a direction normal to the width of the material throughout the tape winding procedure.

2. Apparatus for building up a solid body of silica fiber reinforced resin impregnated construction, the body having a hollow center and consisting of ring laminations of tape material, the direction of the laminations being at a selected angle which is other than parallel with the length of the body, the apparatus including turntable means, means for rotating the turntable means at a selected rate, a frame structure coupled to and supporting the turntable means, a rotatable mandrel mounted on and movable with the turntable means and rotatably mounted in the frame, the mandrel having the approximate configuration desired for the inner form of the solid body and including a lay-up ring portion adjacent the turntable means, the lay-up ring portion having a surface which is substantially parallel to the direction desired for the ring laminations, whereby the tape material may be laid down as a helical winding about the mandrel from the lay-up ring portion as the mandrel is rotated, at least one cylindrical pressure roller movably mounted adjacent the periphery of the mandrel in registry with the path of the tape material as it is being laid down about the mandrel, a lengthwise portion of the cylindrical pressure roller circumference extending across the width of the tape material and being divided into separate segments across the width, the peripheral surfaces of the segmented portions of the pressure roller being of a material having a low coefficient of friction, and means including at least one support arm coupled to the pressure roller and supporting the pressure roller against the tape material as it is being laid down about the mandrel, said means being positioned to maintain a relatively uniform pressure from the pressure roller upon the tape material in a direction normal to the width of the tape material as the tape winding progresses.

3. Apparatus for providing a high density fiber reinforced structure in the form of a hollow thick-walled body of the general configuration of a surface of revolution, the structure being built up of laminations of a distortable strip material, and the fibers in the strip material being at an end oriented angle to the edge of the strip material, the apparatus including in combination a frame structure, a central mandrel having an outer surface which defines the approximate hollow internal surface of the desired body, the mandrel being mounted with and rotatable with respect to the frame, whereby the strip material may be wound edgewise upon the mandrel to build up a solid body thereon, at least one arm extending from the frame adjacent to the mandrel, the arm being laterally and pivotally movable relative to the frame, a pressure roller rotatably mounted on the end of the arm closest to the mandrel, the pressure roller being pivotally adjustable relative to the arm and having a cylindrical surface registerable across the surface of the strip material which is being wound, the roller being segmented into different separately rotatable portions across the width of the strip material, means coupled to the roller and positioned to maintain the roller parallel to the strip material and to maintain a uniform roller pressure upon the strip material in a direction normal to the width of the strip material as the body is built up.

4. Apparatus for providing a high density fiber reinforced structure in the form of a hollow thick-walled body having the general configuration of a surface of revolution, the structure being built up of ring laminations of a distortable strip material and the fibers in the strip material being end grain oriented relative to the inner and outer surfaces of the body, the apparatus including in combination a frame structure, a rotatable central mandrel having an outer surface which defines the approximate hollow internal surface of the desired body, the mandrel being mounted within and rotatable with respect to the frame and including a lay-up ring portion at one end thereof, whereby the strip material may be wound edgewise about the mandrel with the width of strip forming the thickness of the wall of the body and successive turns of the strip material providing the desired ring laminations, a pair of support arms extending from the frame adjacent to the mandrel, each of the support arms being laterally and pivotally movable relative to the frame, a pair of pressure rollers, each rotatably mounted on the end of a different support arm at the point closest to the mandrel, each pressure roller being pivotally adjustable relative to the arm on which it is mounted and having a cylindrical surface, the length of which registers across the surface of the strip material which is being wound, each roller being segmented into different separately rotatable portions across the width of the strip material, means coupled to each of the rollers and positioned to maintain the roller parallel to and bearing against the strip material laminations across the width thereof, and means coupled to each of the support arms and positioned to maintain a uniform roller pressure against the strip material in a direction normal to the width thereof as the body is built up around the mandrel.

5. Apparatus for fabricating a thick-walled hollow body having the form of a surface of revolution from a distortable tape material, the apparatus including rotatable means about which the tape material may be wound edgewise, to provide the approximate configuration desired for the hollow body, the rotatable means including a lay-up surface defining substantially the direction desired for successive turns of the tape material, rotatable pressure means including a number of individually rotatable segments disposed across the width of the tape material as it is being wound about the rotatable means, the pressure means being positioned to press against the tape material in a direction normal to the lay-up surface of the central means, and means coupled to the pressure means and positioned to maintain a substantially uniform pressure from the pressure means upon the tape material in said normal direction during the build-up of the hollow body.

6. A machine for forming a relatively thick-walled structure having the form of a surface of revolution about a central axis and consisting of a fiber reinforced resinous body, the fibers in which are disposed as ring laminations having a selected angle to the axis of the surface of revolution, the machine including in combination a generally rectangular frame having a base portion and an upper portion, a turntable rotatably mounted in the base portion of the frame and rotatable about a vertical axis, means coupled to the turntable for rotating the turntable about the vertical axis, a mandrel of selected configuration concentrically mounted upon and rotatable with the turntable, the mandrel including a base lay-up ring having a circumferential surface at a selected angle relative to the vertical axis, the selected angle being that desired for the direction of lamination, the mandrel being adapted to receive a fiber reinforced resin impregnated tape material wound helically about the mandrel commencing with the base lay-up ring, a pair of support arms mounted on the upper portion of the frame and extending at their free ends adjacent to the mandrel, the support arms being movable laterally with respect to the vertical axis and pivotally relative to the frame, a pair of pressure devices including a pair of pistons, each mounted on a different support arm and extending therealong, a pair of pressure roller devices mounted on the different pistons and positioned to bear against the tape material as it is being wound upon the mandrel, the pressure roller devices rotating about axes which are normal to the path of movement of the tape material, and each of the pressure roller devices being radially segmented with respect to the vertical axis, and means coupled to the pair of pressure-operated devices and positioned to operate the pressure roller devices with a constant pressure against the tape material across the width thereof and also in a direction normal to the width of the tape material along the entire length of the mandrel.

7. A machine for winding fiber reinforced strip material about a mandrel of selected form to define a thick-walled body having a hollow center of the form of the mandrel and a direction of laminations for the strip material which is of at least an acute angle relative to the surface of the mandrel, with individual fibers of the strip material having an end grain orientation, the machine including the combination of a generally rectangular frame having a base portion, side support elements and an upper portion joining the side support elements, a turntable rotatably mounted in the base portion of the frame and being rotatable about a vertical axis extending centrally along the frame, a mandrel of the selected form concentrically mounted upon and driven by the turntable, the mandrel including a base lay-up ring which defines a circumferential surface extending at a selected angle relative to the vertical axis, the selected angle corresponding to the direction of laminations desired for the strip material, a pair of support elements mounted in the upper portion of the frame, each of the support elements being laterally movable relative to the upper portion of the frame, a pair of support arms, each mounted in a different one of the support elements and being pivotally movable relative thereto, the free ends of the support arms extending adjacent to the mandrel, a pair of air cylinders, each mounted on a different one of the support arms, a pair of piston elements, each operatively associated with a different one of the air cylinders and extending along the support arms, a pair of pressure rollers, each mounted in a free end of a different one of the pistons, the axes of the pressure rollers extending from the piston elements in the direction toward the vertical axis and the length of the circumference of the rollers registering across the width of strip material wound upon the mandrel, the rollers being pivotally movable relative to the piston element so as to provide a surface bearing normally against the strip material as it is wound, each pressure roller consisting of a number of polytetrafluoroethylene disks which are rotatable relative to each other, and pressure regulating means coupled to the piston elements and to the air cylinders and positioned to maintain substantially constant pressure from the pressure rollers upon the strip material.

8. Apparatus for building up a solid body which has a hollow center, including in combination a rotatable central mandrel lying along and rotatable about a given axis, means for supplying a distortable tape material which is to be wound about the mandrel to form the solid body, means for supplying a filament coextensively with the tape material, means for folding the tape material along its length about the filament with the edges of the tape material being folded in toward the filament, at least one pressure roller movably mounted adjacent the periphery of the mandrel in registry with the path of the tape material which is being added onto the mandrel, and means coupled to the pressure roller and positioned to maintain a relatively uniform pressure by the pressure roller upon the tape material across the width thereof and also normal to the width thereof throughout the winding procedure.

9. Apparatus for building up a solid body of fiber reinforced construction, the body having a hollow center and consisting of ring laminations of fiber tape material, the apparatus including turntable means, means for rotating the turntable means at a selected rate, a frame structure coupled to and supporting the turntable means, a rotatable mandrel mounted on and movable with the turntable means and rotatably mounted in the frame, the mandrel having the approximate configuration desired for the inner form of the solid body, means providing a frictional facing surface about the mandrel, so that the tape material may be helically wound edgewise about the mandrel in a firm relationship thereto, at least one cylindrical pressure movably mounted adjacent the periphery of the mandrel in registry with the path of the tape material as it is being wound about the mandrel, and means including at least one support arm coupled to the pressure roller and positioned to maintain a relatively uniform pressure by the pressure roller upon the tape material across the width thereof and also in a direction normal to the width thereof throughout the winding procedure.

10. Apparatus for providing a high density fiber reinforced structure in the form of a hollow thick-walled body having the general configuration of a surface of revolution, the structure being built up of ring laminations of a distortable strip material and the fibers in the strip material being end grain oriented relative to the inner and outer surfaces of the body, the apparatus including in combination means for supplying a textile fiber strip material cut on a bias, means for supplying a filament coextensively with and along the length of the strip material, means positioned to fold the edges of the strip material in toward the filament, means positioned to fold the strip material about the filament, a frame structure, a rotatable central mandrel having an outer surface which defines the approximate hollow internal surface of the desired body, the mandrel being mounted within and rotatable with respect to the frame and including a lay-up ring portion at one end thereof, having a strip material-receiving face disposed at an acute angle to the surface of the mandrel, means encompassing the mandrel and providing a frictional facing surface therefor, a pair of support arms extending from the frame adjacent to the mandrel, each of the support arms being laterally and pivotally movable relative to the frame, a pair of pressure rollers, each rotatably mounted on the end of a different support arm at the point closest to the mandrel, each pressure roller being pivotally adjustable relative to the arm on which it is mounted and having a cylindrical surface, the length of which registers across the surface of the strip material which is being wound, each roller being segmented into different separately rotatable portions across the width of the strip material, means coupled to each of the rollers and positioned to maintain the roller parallel to the strip material and bearing against the strip material, and means coupled to each of the support arms and positioned to maintain a uniform roller pressure against the strip material across the width thereof and also normal to the width thereof throughout the winding procedure.

11. Apparatus for providing a thick-walled hollow body from fiber reinforced strip material and a filament, including the combination of a central rotatable member about which the strip material may be wound edgewise, the central rotatable member having a frictional facing surface, means for folding the strip material about the filament prior to winding with the edges of the strip material being folded in, and pressure means having a surface which has a low coefficient of friction and which includes individual separately rotatable pressure segments disposed across the width of the strip material.

12. Apparatus for building up a solid body which has a hollow center, including in combination a rotatable central mandrel lying along and rotatable about a given axis, the mandrel being positioned to receive tape material which is to be wound thereabout to form a solid body, at least one pressure roller mounted adjacent the periphery of the mandrel in registry with the path of the tape material and movable along said path, the pressure roller extending across the width of the tape material, and fluid activated pressure means coupled to the pressure roller movable therewith and positioned to maintain substantially uniform pressure from the pressure roller against the tape material across the width thereof and also in a direction normal to the width thereof throughout the tape winding procedure.

13. Apparatus for building up a solid body which has a hollow center, including in combination a rotatable central mandrel lying along and rotatable about a preselected axis, the mandrel being positioned to receive tape material which is to be wound thereabout to form a solid body, at least one pressure roller mounted adjacent the periphery of the mandrel in registry with the path of the tape material and movable along said path, the pressure roller extending across the width of the tape material and being divided into separate segments across the width thereof, and fluid activated pressure means coupled to and movable with the pressure roller and positioned to maintain an essentially uniform pressure from the pressure roller against the tape material across the width thereof and also in a direction normal to the width thereof throughout the tape winding procedure.

14. Apparatus for building up a solid body which has a hollow center, including in combination a rotatable central mandrel lying along and rotatable about a given axis, the mandrel being positioned to receive tape material which is to be wound thereabout to form a solid body, at least one pressure roller mounted adjacent the periphery of the mandrel in registry with the path of the tape material and movable along said path as the tape material is wound onto the mandrel, the pressure roller being parallel to and extending across the whole width of the tape material and being divided into separate segments across the width thereof, fluid activated pressure means coupled to and movable with the pressure roller and positioned to maintain an essentially uniform pressure from the pressure roller against the tape material across the width thereof and also in a direction normal to the width thereof throughout the tape winding procedure, and means coupling said pressure means to said roller, said coupling means being pivotally mounted, whereby the angle of the pressure roller is adjustable with respect to the axis of the mandrel.

15. A machine for winding fiber reinforced strip material about a mandrel of selected form to define a thick-walled body having a hollow center of the form of the mandrel and a direction of laminations for the strip material which is of at least an acute angle relative to the surface of the body, with individual fibers of the strip material having an end grain orientation, the machine including the combination of a frame, a turntable rotatably mounted in the frame, a mandrel mounted upon and driven by the turntable, the mandrel including a base lay-up ring which defines a circumferential surface extending at a selected angle relative to the vertical axis, the selected angle corresponding to the direction of laminations desired for the strip material, a plurality of support means pivotally mounted in the frame, and movable relative thereto, the free ends thereof extending adjacent to the mandrel, a pneumatic pressure means connected to each support element, a pressure roller pivotally connected to each of said pressure means and bearing against the strip material across the width thereof as the strip material is wound upon the mandrel, and pressure regulating means coupled to said pressure means and positioned to maintain substantially uniform pressure from the pressure rollers upon the strip material throughout the strip winding procedure.

References Cited in the file of this patent

UNITED STATES PATENTS

| 61,173 | Dodge | Jan. 15, 1867 |
| 1,561,229 | Haon | Nov. 10, 1925 |
| 1,773,382 | Trundle | Aug. 19, 1930 |
| 2,236,901 | Hall | Apr. 1, 1941 |
| 2,504,144 | Morris | Apr. 18, 1950 |
| 2,726,978 | Skinner | Dec. 13, 1955 |
| 2,950,152 | Garceau | Aug. 23, 1960 |

FOREIGN PATENTS

| 539,466 | Great Britain | Sept. 11, 1941 |

UNITED STATES PATENT OFFICE
CERTIFICATE OF CORRECTION

Patent No. 3,141,806

July 21, 1964

Albert A. Reinman

It is hereby certified that error appears in the above numbered patent requiring correction and that the said Letters Patent should read as corrected below.

Column 1, line 70, for "af" read -- of --; column 8, line 25, after "Accordingly" insert a comma; column 9, line 15, for "distrurbing" read -- disturbing --; column 12, line 57, after "pressure" insert -- roller --.

Signed and sealed this 8th day of December 1964.

(SEAL)
Attest:

ERNEST W. SWIDER
Attesting Officer

EDWARD J. BRENNER
Commissioner of Patents